Figure 1:
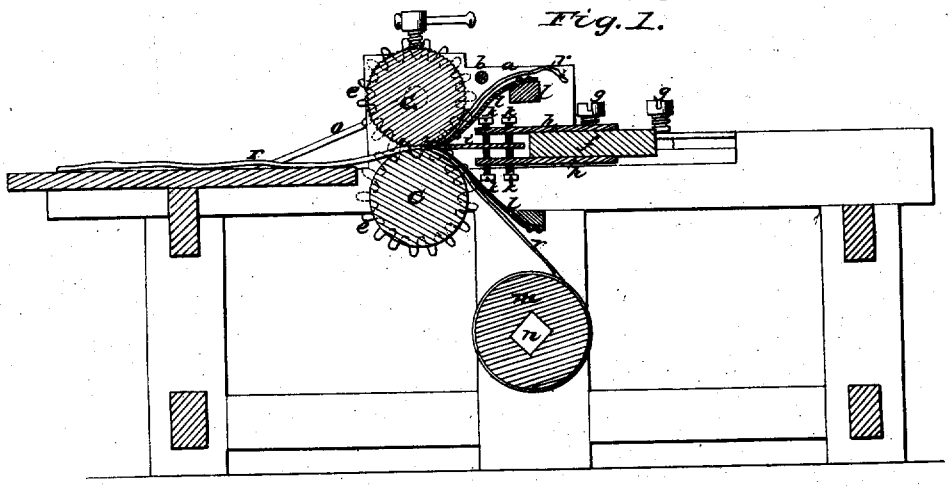
Figure 2:
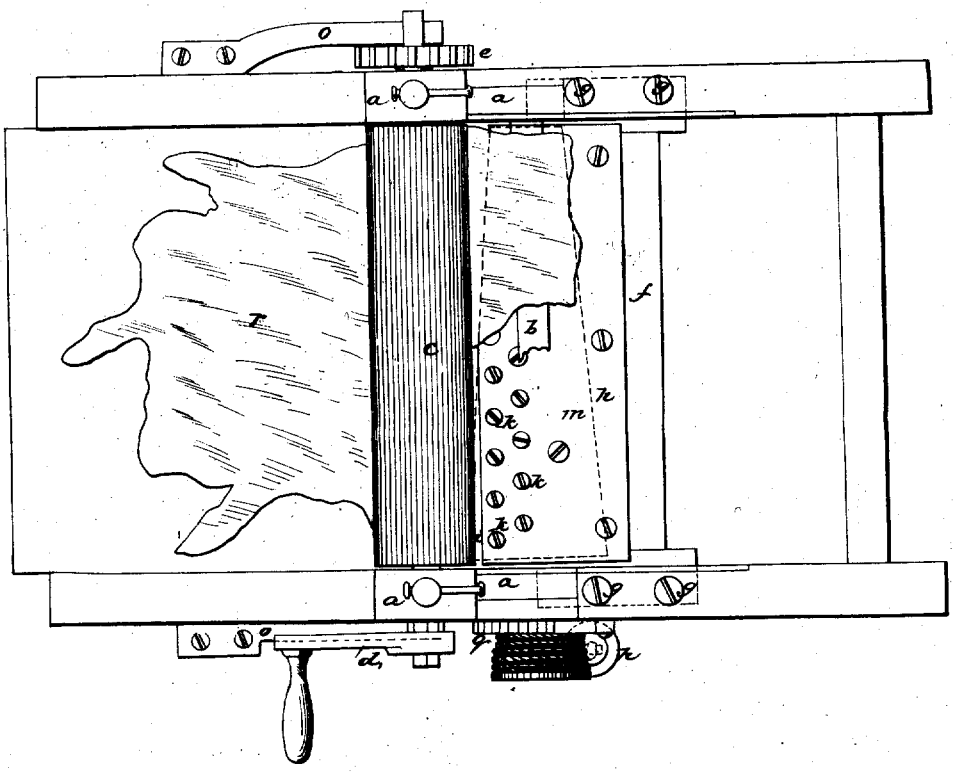

S. Boyden,

980X

Splitting Leather,

Patented Jan. 7, 1809.

S. BOYDEN.
Splitting Leather.
Patented Jan'y 7, 1809.
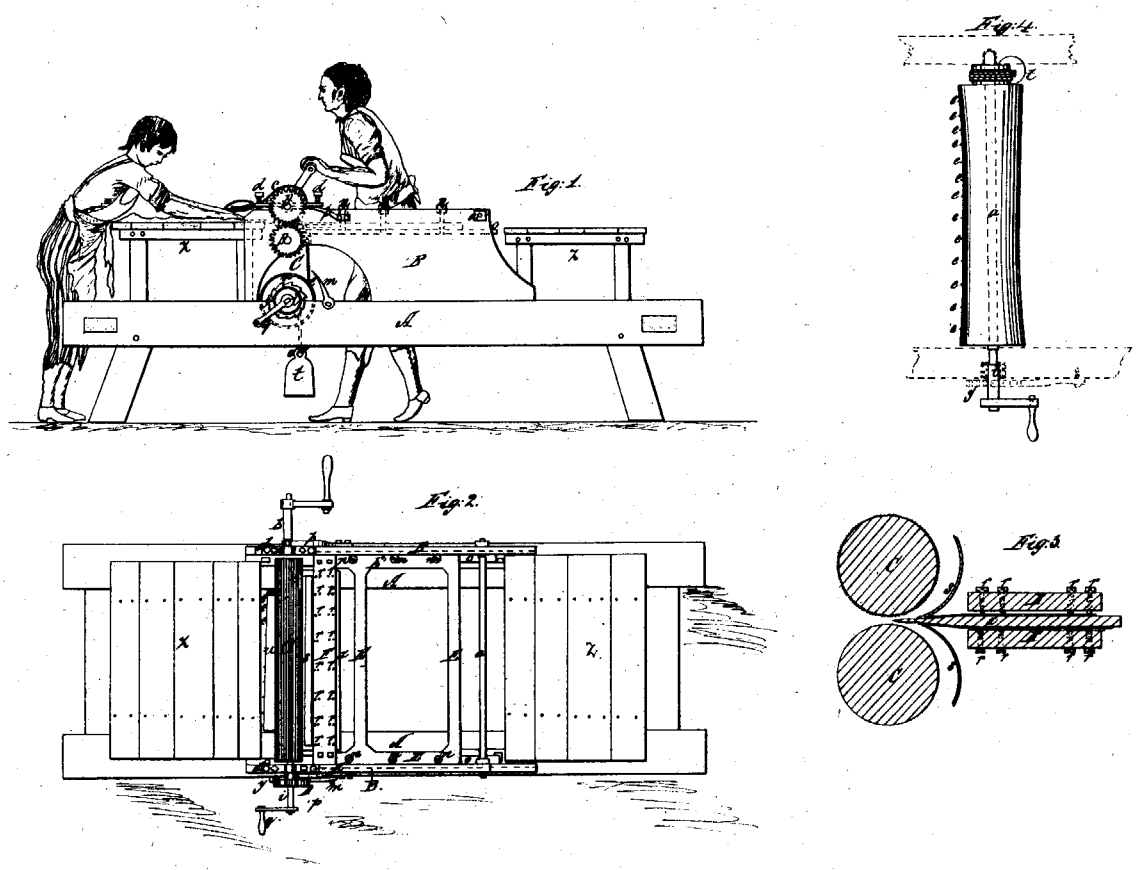
N. PETERS, Photo-Lithographer, Washington, D. C.

Jan 7. 1809 [illegible]

980X

Seth Boyden

Letters Patent Issued Jan. 7. 1809.

The Schedule referred to in these Letters Patent and making part of
the same containing a description in the words of the said Seth Boyden him
self of his machine for splitting Hides & shaving Leather

---

The wooden frame of this machine consists of two parallel pieces of timber framed to
gether at the ends & supported by four legs. From this frame rise the two sides of
the cutting machinery, made of iron or other metal & connected together by
one or more metallic bars extending from side to side on the top. Within
these sides in front are two iron or other sufficiently hard metallic cyl
inders with their pivot ends resting in the sides & placed perpendicularly
over each. On the end of the uppermost of these rollers or cylinders is a square
gudgeon or shank projecting beyond the side for the purpose of receiving
the crank by which this roller is turned. This uppermost roller is engrav
ed in strait lines horizontally or lengthwise on its surface. This roller may
be placed at any required distance from the lower one by raising the Boxes
in which its pivots turn by means of screw pins. On the opposite end of these
rollers to that on which the crank is placed are two wheels the teeth of which
act on each other so that when the upper roller is turned communicate
motion to the lower roller. Behind these metal cylinders or rollers there is
an horizontal frame for the purpose of holding the knife in the proper po
sition for cutting the leather or skin. This frame is made of metal & of such
substance or thickness as not to vibrate. It slides horizontally between the up
right sides being guided by ledges in the side plates above mentioned so that
the edge of the knife within it can be brought to the leather to cut or remov
ed back from it for the purpose of sharpening. This frame is confined within
the sides in its proper place by screws the heads of which are above the sides.
This frame has two horizontal plates extending from side to side so far apart
as to admit of the knife lying horizontally between them & of any required
thickness. The knife being introduced & its edge advanced as far beyond
the front of the frame as is thought necessary is then secured in its place by
screws passing thro' the upper & lower plates of the frame & resting with their
ends

980X ends against the upper & lower surface of the knife plate. There are four rows
of these screws extending from side to side near the edges of the upper & low-
er plates. There are two tin or other metallic guages which extend from the
upper & lower plates forwards towards the edge of the knife and are curved
almost parallel to the corresponding upper & lower metallic cylinders so that as the
skin passes between the cylinders & is cut by the knife one portion rises
over the frame & the other part descends below the lower cylinder & is at-
tached by pins to a wooden roller underneath, which draws it round
it as fast as the operation of cutting is performed. This wooden roller is
larger at one end than the other & is turned by a square axis passing thro'
a corresponding perforation in its centre, the ends or pivots of this axis
are round & rest upon the wooden frame. On one end of this axis is a ratch
et wheel & pall & a crank. The axis of the upper metallic cylinder are borne
up or supported by means of springs attached to the outside of the side plates
so that when the screws above are eased there is room to see how to set or
place the edge of the knife. These springs bend when the upper cylinder is
depressed by the screws. There is a strap or weight on the opposite end of the
wooden roller to its crank for the purpose of gradually turning the roller
& winding the lower half of the skin upon it as the operation of splitting is
performed. The whole of this machine may be made of cast iron except the
knife the screw pins cranks the iron axis which passes thro' the wooden
roller & the springs. The method of using this machine is as follows. The knife
being placed in the frame behind the rollers it is brought so far for-
ward that the leather will touch its edge before it leaves the rollers between
which it passes. Then gauge the knife by the screw pins in the frame to a
proper distance from the roller so as to cut the under or grain side of the thick-
ness desired. Confine the frame in its place by the screws in the side pieces
& bring down the upper roller by the adjusting screws over its pivots to the
thickness of the leather. After the machine is thus set in order & the leath-
er laid on the table resting on the wooden frame in front of the rollers a
man turns the crank on the axis of the upper roller whilst a boy directs
the head part of the skin between the rollers. The skin is thus drawn for-
ward between the rollers, forced against the edge of the knife, confined and
guaged gauges on the opposite side of the rollers which cuts it before it escapes from
their action & whilst thus compressed cuts shaves or splits it. The two gauges
which come from the upper & lower plates of the frame direct the parts of the skin
one upward & the other down to the wooden roller (round which the strap
with the weight has been wound previously by the crank) & to which it is fasten-
ed by sticking it upon the pins in the roller by a wooden mallet. The pall be-
ing raised from the ratchet wheel on the axis of this roller the weight & strap
begin to act and draw forward the lower part of the skin as the cutting is
performed winding it upon the roller. as the crank of the upper metallic rol-
ler is turned by the man, a boy at the same time is ready to raise or lower the
ends of the roller by means of the screws, as the thickness of the leather varies.
In large hides the skin of the legs which is thin and never wants splitting
passes through in the small parts at each end of the rollers in a folded and
wrinkled manner When the knife wants whetting the screws which confine
the frame are raised & the frame drawn out on the table which rests on the
wooden frame of machine. & is then slid in again & adjusted to its proper
place. When the knife is to be ground the two upper rows of screw pins are
slackened and the knife taken out for that purpose. As sides of leather
are sometimes longer on the belly edge than on the back & as the grain side
must go down next to the smooth roller & head first, when all the right
hand sides are shaved the iron axis is drawn out of the wooden roller & the
ends of the roller are changed, when the skins of the leg go thro' between the
small parts of the rollers. The metal rollers being perfectly cylindrical in
that part opposite the knife, & the wooden roller of greater diameter at
one end than the other the skin will not conform equally to both. When
the boy, he stands at the table to feed the rollers observes that one edge of
the wooden roller draws harder than the other he will ease the screw
on the opposite end which holds down the upper roller. this will slack
the motion of the leather thro' that end of the rollers whilst the other end pro-
gresses & it draws equally. When sheep & calf skins are to be shaved this
wooden roller must be taken out and one put in that is a little smaller
in the middle than at the ends. The force applied to this machine may
be that of man, wind, water & horses as convenience shall dictate. I con-
sider

9?0X uses this machine as highly useful to Tanners & Curriers for splitting
Hides from the lime and tan. That is to shave off in one slice what the
Curriers usually scrape off to make the leather of a proper thickness for the
purpose to which it is to be applied. Such neats hides as are designed
for the upper leathers of shoes & boots & for chaise & other Carriages & the
uses where thin leather is proper may be operated upon from the lime so that
it may be tanned sooner with less bark & more thoroughly. Calf & sheep
skins intended for book binding & other purposes that require very thin leather
may be shaved after tanning. When the hides are shaved in this manner
the piece cut off is of considerable value whereas that scraped off in the usual
way is of no use. A man or a boy of eight or ten years of age will shave
8 or 10 in this manner to one in the usual way whilst the value of the part cut
off will be worth from 1/5 to 1/6 of the dressed skin Seth Boyden Witnesses { Aaron [illegible]
Milton —
Tyler —

[illegible]

Tanning [illegible]